United States Patent Office 3,360,537
Patented Dec. 26, 1967

3,360,537
1-ALUMINUM INDANES AND 1-ALUMINUM TETRALINES AND THEIR MANUFACTURE
Roland Köster, Mulheim (Ruhr), Germany, assignor to Studiengesellschaft Kohle m.b.H., Mulheim (Ruhr), Germany
No Drawing. Filed May 13, 1963, Ser. No. 280,073
Claims priority, application Germany, May 16, 1962, St 19,251
11 Claims. (Cl. 260—448)

This invention relates to heterocyclic organo-aluminum compounds in which the alumuinum is bound in a particular way in a 5- or 6-membered ring, and to their manufacture.

Aluminum compounds with three different hydrocarbon radicals on the aluminum are unknown partly because the radicals on the aluminum can very readily be exchanged with each other. A mixture of different aluminum compounds is normally obtained. It is therefore all the more surprising that in accordance with the present invention it is possible to provide aluminum hydrocarbons, wherein the aluminum appears to be part of a ring system, by a smooth exchange of heterocyclically bonded boron for aluminum.

The present invention thus comprises as novel compounds heterocyclic bound aluminum compounds, wherein aluminum occupies the 1-position in an indane or tetralin ring system (herein designated 1-aluminum indanes and 1-aluminum tetralins), and a process for the preparation of said aluminum compounds, wherein a boron compound of the general formula

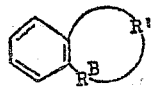

wherein R represents an alkyl, aralkyl or aryl radical and R' the groups —CH$_2$CH$_2$— (for indane) or

—CH$_2$CH$_2$CH$_2$—

(for tetralin) or groups as aforesaid but containing alkyl substituents such as —CH$_2$CH(CH$_3$)— are mixed with organic-aluminum compounds of the general formula AlR"$_3$, wherein R" signifies a hydrocarbon radical, especially trialkyl aluminum compounds, and the readily-volatile boron compounds which are formed are distilled off from the reaction mixture. B-alkyl or B-aralkyl boron indanes or boron tetralins, such as can be prepared by the process of German specification 1,089,384, are very suitable starting materials for the process of the present invention. Reaction according to the invention takes place in accordance with the following general equation:

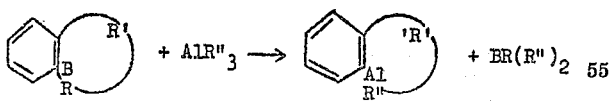

wherein R, R' and R" have the foregoing significance.

According to the invention, starting from trialkyl aluminum compounds and B-alkyl boron indanes, for example, the corresponding alkyl boron compounds and 1-aluminum indanes are very easily obtained. Reaction according to the invention is effected analogously in order to manufacture 1-aluminum tetralin compounds.

It is advantageous to use the alkyl aluminum compounds corresponding to the above equation in excess. All the boron containing compounds are thus easily removed quantitatively from the mixture. This is advantageously carried out by distilling the alkyl boron compounds off under reduced pressure. After the organo-boron components and the excess volatile organo-aluminum compounds have been separated, the remaining liquid in many cases crystallizes completely on cooling. Purification of the organo-aluminum heterocyclic compounds is preferably effected by recrystallization from saturated aliphatic or aromatic hydrocarbons. However, this is not usually necessary as the aluminum heterocyclic compound precipitates in very pure form immediately after separation of the volatile components from the mixture.

The 1-alkyl aluminum indanes and 1-alkyl aluminum tetralins are dimeric in solution and form etherates in monomeric form. In the reaction of aluminum heterocyclic compounds with alcohols, 1 mol alkane and 1 mol alkyl benzene are formed per mol of 1-alkyl aluminum compound employed.

The heterocyclic aluminum products forming the subject of this invention are suitable for use as catalyst components.

The process according to the present invention can be illustrated by the following examples:

Example 1

172 g. (1 mol) B-propyl-3-methyl boron indane are mixed with 200 g. (1.28 mol) tripropyl aluminum at room temperature. 98 g. (1 mol) tripropyl boron (100%) are subsequently distilled off from the mixture under reduced pressure. Distillation is begun at room temperature and the temperature in the reaction mixture is slowly raised to about 120° C. The excess tripropyl aluminum is subsequently distilled off under greatly reduced pressure. When cooled, the residue crystallizes completely. The compound 1-propyl-3-methyl-1-aluminum indane melts at 79° C. without decomposing. It can readily be recrystallized from hexane. Molecular weight determination (cryoscopy in cyclohexane) yields a molecular weight of 380 (theoretical value for the dimeric compound=376). With alcohols, 1 mol of propane develops from 1 mol of the monomeric compound.

Example 2

In accordance with Example 1, a 98% yield of 1-ethyl-3-methyl-1-aluminum indane with the melting point 102–103° C. is obtained from 17 g. (0.175 mol) B-ethyl-3-methyl boron indane and 23.6 g. (0.207 mol) triethyl aluminum. The compound can be recrystallized from pentane. Aluminum content found: 15.3% (calculated 15.5%).

Example 3

Proceeding as indicated in Example 1, and after 1 mol triethyl boron and the excess triethyl aluminum (0.5 mol) have been distilled off, a weakly viscous liquid whose aluminum content corresponds to Al-(2-phenylpropyl)-3-methyl-1-aluminum indane is obtained from 1 mol B-(2-phenylpropyl)-3-methyl boron indane and 1.5 mol triethyl aluminum.

Example 4

After distilling off tripropyl boron (1 mol) and excess tripropyl aluminum (0.4 mol), Al-propyl-1-aluminum tetralin is obtained in quantitative yield from a mixture of 1 mol B-propyl boron tetralin and 1.4 mol tripropyl aluminum. It is a colorless, clear liquid which crystallizes only slowly. When the compound is hydrolized, propane and propyl benzene form in the ratio 1:1.

Example 5

After 1 mol 1-ethyl-3-methyl-1-boron tetralin has been mixed with 1.2 mol triethyl aluminum, distillation under reduced pressure yields 1 mol boron triethyl. After prolonged standing at room temperature, dimeric 1-ethyl-3-methyl-1-aluminum tetralin crystallizes from the residue. The compound can be recrystallized from hexane. (Melting point about 85° C.) The yield is quantitative.

Example 6

In accordance with Example 5, a quantitative yield of 1-propyl(b)cyclohexano-1-aluminum tetralin in the form of a highly viscous liquid which crystallises completely after prolonged standing at room temperature is obtained from 1 mol 1-propyl(b)cyclohexano-1-boron tetralin and 1.2 mol tripropyl aluminum.

Example 7

After ethyl- and isobutyl-boron have been distilled off, a quantitative yield of colorless (dimeric) 1-ethyl(b)benzo-1-aluminum indane with a melting point of 230° C. is obtained from 1 mol 1-isobutyl(b)benzo-1-boron indane (yellow-colored compound with M.P.: 13.5° C.) and 1.5 mol triethyl aluminum.

Example 8

1 mol 1-(o-ethylphenyl)-1-boron indane (M.P.: 49° C.) is mixed with 1.1 mol triethyl aluminum, the resulting triethyl boron is distilled off under reduced pressure and the crystallized residue is washed with pentane. A quantitative yield of 1-(o-ethylphenyl)-1-aluminum indane which decomposes when heated to about 160° C. is obtained.

I claim:

1. A heterocyclic bound aluminum compound of the formula

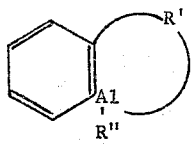

wherein R' represents a member selected from the group consisting of —$CH_2CH_2CH_2$— and alkyl substituted derivatives thereof and R" represents a hydrocarbon group.

2. A heterocyclic bound aluminum compound of the formula

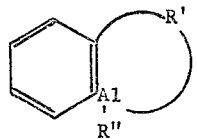

wherein R' represents a member selected from the group consisting of —$CH_2CH_2CH_2$— and alkyl substituted derivatives thereof and R" represents a hydrocarbon group.

3. A heterocyclic bound compound of the formula

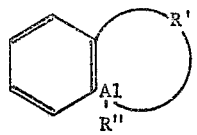

wherein R' represents a member selected from the group consisting of —$CH_2CH_2$— and alkyl substituted derivatives thereof and —$CH_2CH_2CH_2$— and alkyl substituted derivatives thereof, and R" represents a hydrocarbon group.

4. 1-propyl-3-methyl-1-aluminum indane.
5. 1-ethyl-3-methyl-1-aluminum indane.
6. Al-(2-phenyl-propyl)-3-methyl-1-aluminum indane.
7. Al-propyl-1-aluminum tetralin.
8. 1-ethyl-3-methyl-1-aluminum tetralin.
9. 1-propyl(b)cyclohexano-1-aluminum tetralin.
10. 1-ethyl(b)benzo-1-aluminum indane.
11. 1-(o-ethyl-phenyl)-1-aluminum indane.

References Cited

UNITED STATES PATENTS 3,087,953   4/1963   Koster _____ 260—448

OTHER REFERENCES

Angewandte Chemie 71 (Aug. 21, 1959), page 520.
Angewandte Chemie 71 (Aug. 21, 1959), page 521.
J. Amer. Chemical Society 84 (Apr. 20, 1962), pages 1501–1502.

TOBIAS E. LEVOW, *Primary Examiner.*

UNITED STATES PATENT OFFICE
CERTIFICATE OF CORRECTION

Patent No. 3,360,537　　　　　　　　　　　　　December 26, 1967

Roland Köster

It is hereby certified that error appears in the above numbered patent requiring correction and that the said Letters Patent should read as corrected below.

Column 1, line 12, for "alumuinum" read -- aluminum --; line 42, for "organic—aluminum" read -- organo-aluminum --; column 3, line 42, for "-CH$_2$CH$_2$CH$_2$-" read ---CH$_2$CH$_2$- --.

Signed and sealed this 4th day of March 1969.

(SEAL)
Attest:

Edward M. Fletcher, Jr.　　　　　　　　　　　EDWARD J. BRENNER
Attesting Officer　　　　　　　　　　　　　　Commissioner of Patents